(12) United States Patent
Atares Real et al.

(10) Patent No.: US 12,221,396 B2
(45) Date of Patent: Feb. 11, 2025

(54) METHOD FOR OBTAINING A GRANULATED PHOSPHATE FERTILISER AND PHOSPHATE FERTILISER OBTAINED

(71) Applicant: FERTINAGRO BIOTECH, S.L., Teruel (ES)

(72) Inventors: Sergio Atares Real, Teruel (ES); Joaquin Romero Lopez, Teruel (ES); Ignasi Salaet Madorran, Teruel (ES); María Ferrer Gines, Teruel (ES); Marcos Caballero Molada, Teruel (ES); Tula Del Carmen Yance Chavez, Teruel (ES); Carlos Fuertes Doñate, Teruel (ES)

(73) Assignee: FERTINAGRO BIOTECH, S.L., Teruel (ES)

( * ) Notice: Subject to any disclaimer, the term of this patent is extended or adjusted under 35 U.S.C. 154(b) by 966 days.

(21) Appl. No.: 17/276,942

(22) PCT Filed: Oct. 5, 2018

(86) PCT No.: PCT/ES2018/070644
§ 371 (c)(1),
(2) Date: Mar. 17, 2021

(87) PCT Pub. No.: WO2020/070347
PCT Pub. Date: Apr. 9, 2020

(65) Prior Publication Data
US 2022/0033320 A1  Feb. 3, 2022

(51) Int. Cl.
*C05B 19/00* (2006.01)
*C05B 17/00* (2006.01)
*C05G 5/12* (2020.01)

(52) U.S. Cl.
CPC .............. *C05B 19/00* (2013.01); *C05B 17/00* (2013.01); *C05G 5/12* (2020.02)

(58) Field of Classification Search
CPC ............ C05B 19/00; C05B 17/00; C05G 5/12
See application file for complete search history.

(56) References Cited

U.S. PATENT DOCUMENTS

| | | | | |
|---|---|---|---|---|
| 2,912,317 A | * | 11/1959 | Gloss | C05B 13/02 71/25 |
| 2,987,263 A | * | 6/1961 | Senn | C05B 19/00 241/97 |
| 2005/0039509 A1 | | 2/2005 | Muma | |
| 2008/0105018 A1 | | 5/2008 | Grech | |
| 2011/0100078 A1 | | 5/2011 | Ho et al. | |

FOREIGN PATENT DOCUMENTS

| | | | | |
|---|---|---|---|---|
| CN | 101066897 A | 11/2007 | | |
| CN | 101186879 A | 5/2008 | | |
| CN | 101429059 A | 5/2009 | | |
| CN | 101429071 A | 5/2009 | | |
| CN | 101468924 A | 7/2009 | | |
| CN | 101905982 A | 12/2010 | | |
| CN | 107043313 A | 8/2017 | | |
| EP | 1698595 A1 | 9/2006 | | |
| ES | 2 234 417 A1 | 6/2005 | | |
| WO | 2009070966 A1 | 6/2009 | | |
| WO | WO 2012/070955 A1 | * | 5/2012 | C05G 1/00 |

OTHER PUBLICATIONS

International Search Report, PCT/ES2018/070644, Dated May 20, 2019.

* cited by examiner

*Primary Examiner* — Wayne A Langel
(74) *Attorney, Agent, or Firm* — Calderone McKay, LLC

(57) ABSTRACT

The invention provides a method for obtaining a granulated phosphate fertiliser, as a phosphorus source, for direct use in agriculture, from the natural raw materials phosphate rock, a carbon source, a metabolic inducer of phosphorus-solubilising microorganisms and water.

7 Claims, No Drawings

METHOD FOR OBTAINING A GRANULATED PHOSPHATE FERTILISER AND PHOSPHATE FERTILISER OBTAINED

BACKGROUND OF THE INVENTION

1. Field of the Invention

The present invention relates to a method for obtaining a granulated phosphate fertiliser from phosphate rock, as well as the phosphate fertiliser obtained by means of said method.

More specifically, the invention provides a method for obtaining a granulated phosphate fertiliser, as a phosphorus source, for direct use in agriculture, from natural raw materials such as phosphate rock, a natural carbon source, a metabolic inducer of phosphorus-solubilising microorganisms and water.

The biological fertiliser obtained according to the method of the invention is a product rich in available (assimilable) phosphorus and can be used as an organic amendment in agricultural anchor forest soils or it can be mixed with other materials to obtain a complex fertilising product or an organo-mineral fertiliser (mixture or combination of mineral and organic fertilisers).

2. Description of the Related Art

Phosphorus, as an essential nutrient for plants, can only be used if it is in an assimilable form. In this regard, when soluble phosphoric fertilisers are used with a view to enriching the phosphorus content of the solution of the soil, most of it generally changes into less soluble forms, being retained or fixed, becoming hardly usable by the plant. This phenomenon varies between different soils and regions of the world, but, where it is intense, high enough phosphorus doses must be used to saturate the fixation points of this nutrient and maintain an adequate concentration of the same in the soil solution or use amendments that decrease the phosphorus fixation capacity (Sánchez, 1976).

The physico-chemistry of phosphorus in mineral soils is quite complex due to the occurrence of a series of simultaneous and instantaneous reactions such as solubilisation, precipitation, adsorption (retention)/desorption and oxidation-reduction. Soluble phosphorus compounds have very high reactivity, low solubility and reduced mobility. Mineralisation and immobilisation are important processes of the phosphorus cycle in soils with a high content of organic matter (Black, 1968; FAO, 1984). When a water-soluble phosphate fertiliser is used on the soil, it reacts quickly with the compounds of the soil. The resulting products are less-soluble phosphorus compounds and the phosphorus that is adsorbed on colloidal soil particles (FAO, 1984). A small concentration of phosphorus in the solution of the soil is generally adequate for normal plant development. For example, Fox and Kamprath (1970) and Barber (1995) have suggested that a concentration of 0.2 ppm phosphorus is sufficient for optimal growth. However, for plants to absorb the amounts of phosphorus necessary to produce good yields, the phosphorus concentration in the solution of the soil that is in contact with the roots must be continually renewed throughout the growth cycle.

Water-soluble phosphate fertilisers such as superphosphates are manufactured and commonly recommended to correct phosphoric deficiencies; however, most developing countries must import these fertilisers, which are in limited quantities and represent a large outlay for small farmers. In addition, the intensification of agricultural production requires the use of phosphorus not only to increase crop production but also to improve the level of this element in soils and thus avoid further degradation of the same. Therefore, it is imperative to explore alternative phosphoric sources. Under certain soil and climate conditions, direct use of phosphate rocks, especially if they are available locally, has proven to be an interesting alternative to superphosphates, both agronomically and economically, since the latter are more expensive. There are phosphate rock deposits throughout the world and some are exploited mainly as raw material for the production of water-soluble phosphate fertilisers (FAO BULLETIN 13: FERTILISERS AND VEGETABLE NUTRITION, 2007, ISBN 978-92-5-305030-7).

Usually, phosphate rocks are the commercial source of phosphorus used as a raw material for manufacturing phosphate fertilisers and other chemical products. Unlike other basic commodities such as iron, copper and sulphur, phosphate rocks have little opportunity for replacement or recycling. They rank second (excluding coal and hydrocarbons) in gross weight and volume in international trade. The fertiliser industry consumes about 90 percent of the world's phosphate rock production. Sulphuric acid and phosphate rock are the raw materials for the production of simple superphosphate and phosphoric acid. Phosphoric acid is an important intermediate product for producing triple superphosphate and ammonium phosphates. High concentration NPK compound fertilisers are currently the main base of the global fertiliser industry (Engelstad and Hellums, 1993; UNIDO and IFDC, 1998).

Phosphoric rocks of sedimentary origin are suitable for direct use because they consist of widely open and weakly consolidated aggregates of microcrystals, with a relatively large specific area. They have a considerable proportion of isomorphic substitution in the crystal lattice and contain accessory minerals and impurities in varying amounts and proportions. Various authors have indicated that these rocks are suitable for direct use in soils under certain conditions (Khasawneh and Doll, 1978; Chien, 1992; Chien and Friesen, 1992; Chien and Van Kauwenbergh, 1992; Chien and Merlon, 1995b; Rajan et al., 1996; Zapata, 2003). The practice of the direct use of various sources of phosphate rocks as fertilisers has many advantages:

Phosphate rocks are naturally occurring minerals that require minimal metallurgical processing. The direct use of phosphate rocks avoids the traditional process of wet acidification to produce water-soluble phosphate fertilisers and avoids the production cycle of polluting wastes such as phosphogypsum and greenhouse gases, resulting in energy savings and environmental protection from industrial pollution.

Being natural products, phosphate rocks can be used in biological farming.

Direct use enables the use of phosphate rock sources that cannot be utilised in the industry for the production of water-soluble phosphate fertilisers and phosphoric acid.

Under certain conditions, reactive phosphate rocks may be more efficient than water-soluble phosphate fertilisers based on the recovery of phosphorus by the plants.

Based on the cost per unit of phosphorus, local phosphate rocks are usually the cheapest products.

Due to the extremely variable and complex chemical composition thereof, phosphate rocks are sources of various nutrients in addition to phosphorus. They are commonly used to improve the phosphoric level of the soil, but when they solubilise they also release other nutrients present in the rock, improving the biological activity of the soil and the accumulation of carbon in the soil, helping to improve the physical and chemical properties thereof. Phosphate rocks thereby playing an important role helping to improve soil fertility.

As mentioned, a chemical treatment with acids or microorganisms must generally be carried out to solubilise the phosphorus present in phosphoric rocks, which implies a high economic cost, in addition to the possible pollution of the environment.

By means of chemical treatment with acids, for example, normal superphosphate or simple superphosphate phosphate fertilisers are obtained (product obtained by reacting crushed mineral phosphate with sulphuric acid and containing, as essential components, monocalcium phosphate and calcium sulphate or triple superphosphate (obtained by reacting crushed mineral phosphate with phosphoric acid and containing, as an essential component, monocalcium phosphate).

Moreover, biological processes represent significant energy savings compared to chemical methods and, at the same time, are much less aggressive from an environmental point of view. In most cases, for these biological processes to enable efficient performance at an industrial level, an anaerobic microbial fermentation must be carried out from different phosphorus sources (see for example US2008/10105018 A1), which makes it necessary to have specific industrial facilities, such as fermentation reactors, which involve a significant investment in both assets and high cost raw materials (see for example patent application EP1698595 A1).

Biological fermentation processes have been well known for decades. By means of these processes the aim is to ferment the organic matter from different raw materials of animal or plant origin (CN101186879 A), resorting in many cases to a microbial inoculation with specific microorganisms to favour said fermentation. Taking advantage of the fermentation process of organic matter, many authors have tried to solubilise phosphate rock, achieving very low yields, either due to the type of rock used or due to the rest of the raw materials used in composting, which can intervene in said processes, resulting in a final product with almost negligible levels of available phosphorus (approximately 472.66 mg/kg, Marcano et al., 1999).

In the state of the art there are many products that contain microorganisms in the formulation thereof, some of them being phosphorus solubilisers. These products may contain bacteria and/or fungi, being able to find products that have a single strain or, in some cases, that contain a pool of these microorganisms. These are incorporated into the fertiliser along with other constituents to favour the viability and exert the action thereof once used on the soil (see, for example, documents CN101429059 A, WO2009070966 A1, CN101468924 A, CN101066897 A, ES 2 234 417 A1).

SUMMARY OF THE INVENTION

As derived from the aforementioned, both the method for obtaining acid-soluble phosphate fertilisers and that based on microorganisms have drawbacks. Thus, known chemical treatments use strong acids such as sulphuric acid to make phosphorus more soluble and at the same time facilitate the granulation process, generating hard and highly acidic products, these extreme acidic conditions greatly hindering the incorporation into the fertilisers obtained by means of these processes of organic substances that are easily degraded and of phosphorus-solubilising microorganisms.

Moreover, the methods based on phosphorus-solubilising microorganisms have low effectiveness, providing levels of assimilable phosphorus little adjusted to the needs of the plants.

Lastly, the direct use of phosphate rock on the ground is not very effective, since the phosphorus product contained therein is hardly usable by the plants.

The present invention solves the aforementioned drawbacks of the methods known from the current state of the art, providing a method for obtaining a granulated phosphate fertiliser, as a phosphorus source, for direct use in agriculture, from natural raw materials such as phosphate rock, a natural carbon source, a metabolic inducer of phosphorus-solubilising microorganisms and water, optionally together with other additional phosphorus-solubilising microorganisms.

Thus, in a first aspect, the invention relates to a method for obtaining a granulated phosphate fertiliser from natural raw materials such as phosphate rock, a natural carbon source, such as leonardite, black coal, anthracite, lignite or similar, a metabolic inducer of phosphorus-solubilising microorganisms and water, optionally together with other additional phosphorus-solubilising microorganisms.

The method of the invention optionally enables phosphorus-solubilising microorganisms to be incorporated, as well as organic matter to accommodate them and inducers which boost the solubilisation of phosphorus by the microorganisms already present in the soil. In this manner, the chemical action of strong acids is replaced by the biological action of microorganisms regarding the desired soluble phosphorus effect. The removal itself of the strong acid from the method enables the incorporation of metabolic inducers for the phosphorus-solubilising microorganisms present in the soil, due to the pH of the product obtained by means of said method.

In a second aspect, the invention relates to a biological fertiliser obtained by means of the aforementioned method, a fertiliser which contains a high proportion of available phosphorus and suitable for the use thereof as an organic amendment in agricultural and forest soils and/or for being mixed with other materials in order to obtain an organo-mineral fertiliser.

DETAILED DESCRIPTION

According to the first aspect, the invention provides a method for obtaining a granulated phosphate fertiliser which includes the steps of:
i) Granulating ground phosphate rock in a granulator with a particle size between 100 and 500 μm and a humidity between 1 and 2%, a natural carbon source in ground state with a particle size between 0.1 and 1 mm and a humidity of 25 to 35%, a metabolic inducer of phosphorus-solubilising microorganisms and water;
ii) Drying the granulate obtained in step i) by means of a stream of hot air progressively heated from 50° C. to 290° C., avoiding rapid evaporation of the water, with a granule outlet temperature of 50° C.;
iii) Cooling the dry granulate by means of a stream of dry air at room temperature, from 20° C. to 25° C.;
iv) Sieving the cooled granules removing the non-granulated raw material and deteriorated granules to obtain granules with a particle size (average diameter) between 1.5 mm and 3.5 mm;

v) Drying the granulate by direct heating at a temperature of 300° C., reducing the humidity of the granulate to a maximum of 2%, with a granule outlet temperature of 40° C.;

vi) Cooling the granulate by means of a stream of dry air at room temperature, from 20° C. to 25° C.;

vii) Optionally, adding $10^5$ ucf/g of additional phosphorus-solubilising microorganisms of the genus *Bacillus* or *Pseudomonas*;

viii) Sieving the granulate to obtain granules with an average particle size between 2 mm and 4 mm.

Preferably, in step i) of the method of the invention the starting materials are introduced into the granulator in a proportion of 50-80% by weight of phosphate rock, 20-40% by weight of a natural carbon source, a metabolic inducer of phosphorus-solubilising microorganisms in a proportion between 3% and 7% and water in a proportion by weight of at least 10%.

In step i) of the method described, the metabolic inducer is provided to favour the growth of phosphorus-solubilising microorganisms, both of those present in the soil, and those optionally provided in step vii) of the method and, thereby improving the solubilisation of phosphorus by these in the granule. To this end, metabolic inducers can be selected from known metabolic inducers, such as amino acids, monosaccharides, disaccharides and natural organic acids, for example citric acid, gluconic acid or lactic acid. Preferably, the metabolic inducers are applied as liquids to the granulate and in a proportion of between 5% and 7%, sufficient for the biostimulation of the microorganisms, but insufficient for the direct solubilisation of phosphorus.

It should be noted that the first drying step ii) of the granulate is carried out by means of a stream of hot air progressively heated from 50° C. to 290° C. This progressive heating, without using vein burners and flame front, enables a gradual dissipation of the humidity avoiding rapid water vaporisation, which can cause breakage or the appearance of cracks in the granules. Likewise, in the cooling step iii) the passage of a stream of dry air at room temperature enables a progressive cooling of the granule and facilitates a first curing thereof, already giving it a certain hardness and avoiding agglomeration or caking thereof.

In a preferred embodiment of the invention, phosphate rock is selected from phosphate rock with the following characteristics:

| Chemical analysis | On dry sample |
|---|---|
| ph | 8.43 |
| Humidity 65° C | 3.36% |
| Humidity 105° C | 3.57% |
| Total $P_2O_5$ (gravimetry) | 25-40% |
| $P_2O_5$ ammonium citrate solution | 2.09% |
| $P_2O_5$ 2% citric acid solution | 15.77% |
| $P_2O_5$ 2% formic acid solution | 30.52% |
| Total CaO | 53.13% |
| Total Fe | 0.08% |
| $SO_3$ | 0.22% |
| Cl | 0.04% |
| Neutralising value | 36.31% |

Phosphoric rocks with these features come for example from Morocco and Western Sahara.

In another preferred embodiment of the invention, the natural carbon source is selected from leonardite, with the following characteristics:

|  | Average |
|---|---|
| pH | 3.27 |
| Humidity | 28.68% |
| Organic matter | 29.56% |
| $K_2O$ | 0.2% |
| Humic extracts | 25-38% |
| Humic acids | 17-30% |
| Fulvic acids | 15-25% |
| Al | 0.17% |
| Fe | 0.3% |
| Na | 0.25% |
| Si | 0.34% |
| MgO | 0.41% |
| CaO | 1.47% |

Leonardite with these characteristics comes for example from the province of Teruel, although they can be used from any other origin.

The invention also relates to the biological fertiliser obtained by means of the aforementioned method, a fertiliser which contains a high proportion of available phosphorus and suitable for the use thereof as an organic amendment in agricultural and forest soils and/or for being mixed with other materials in order to obtain an organo-mineral fertiliser.

The phosphate fertiliser granules obtained contain 25% of total $P_2O_5$ with humic acids and have a high hardness, much higher than that obtained in direct acid-free granulation processes, between 6 and 15 times higher, and close to that obtained with known acid granulation processes.

In this regard, in the context of the present invention, hardness is resistance to breakage, abrasion and impact. Thus, high hardness prevents the fertiliser granules from breaking during handling, storage and distribution processes and the resistance thereof to abrasion prevents the formation of powder. This hardness variable of a granule is of vital importance in granulated products, since these are transferred in different steps until they are dosed, steps during which the granule may deteriorate due to low hardness.

To check the hardness of the granules, a test to measure the same was carried out with a granulate obtained by means of a conventional acid-free granulation method, a conventional granulation process in the presence of acid and the process described herein.

The hardness checking process was carried out with a hardness tester wherein the granule is arranged and a force is exerted on it, indicating what the breaking force is until the destruction of the granule. In this test, several samples of granules were taken at random, they were compressed and the breaking hardness was measured.

The results are shown in the following table, wherein the average values of the samples are shown:

| T (s) | Conventional acid-free granulation Force (N/cm$^2$) P2 | Granulation according to the invention Force (N/cm$^2$) | Conventional granulation with acid Force (N/cm$^2$) P3 |
|---|---|---|---|
| 1 | 0.1 | 1.1 | 1.8 |
| 2 | 0.2 | 1.2 | 1.9 |
| 3 | 0.1 | 1.13 | 1.9 |
| 4 | 0.1 | 0.1 | 0.1 |

The invention also provides the use of the granulated phosphate fertiliser obtained according to the method of the invention as an organic amendment in agricultural and forest soils and/or for being mixed with other materials in order to obtain a complex fertilising product or an organo-mineral fertiliser.

In a usage example, the field dosage of the granulated phosphate fertiliser depends on the type of crop, for example, for a cereal between 150 kg/ha and 300 kg/ha and for a corn between 500 kg/ha and 700 kg/ha.

The invention claimed is:

1. A method for obtaining a granulated phosphate fertiliser which comprises the steps of:
   i) granulating ground phosphate rock in a granulator, the ground phosphate rock having a particle size between 100 and 500 μm and a humidity between 1 and 2%, a natural carbon source in a ground state with a particle size between 0.1 and 1 mm and a humidity of 25 to 35%, a metabolic inducer of phosphorus-solubilising microorganisms and water to obtain a granulate;
   ii) drying the granulate obtained in step i) by means of a stream of hot air progressively heated from 50° C. to 290° C., avoiding rapid evaporation of the water, with a granule outlet temperature of 50° C. to obtain a dry granulate;
   iii) cooling the dry granulate by means of a stream of dry air at room temperature in the range of 20° C. to 25° C. to obtain cooled granules;
   iv) sieving the cooled granules for removing non-granulated raw material and deteriorated granules to obtain granules with a particle size having an average diameter between 1.5 mm and 3.5 mm;
   v) drying the granules obtained by step iv) by direct heating at a temperature of 300° C. for reducing humidity of the granulate to a maximum of 2%, with a granule outlet temperature of 40° C. to obtain a granulate;
   vi) cooling the granulate obtained by step v) by means of a stream of dry air at room temperature in the range of 20° C. to 25° C.;
   vii) optionally, adding $10^5$ ucf/g of additional phosphorus-solubilising microorganisms of the genus *bacillus* or *pseudomonas* after step i); and
   viii) sieving the granulate obtained by step vii) to obtain granules with an average particle size between 2 mm and 4 mm wherein the metabolic inducer of phosphorus-solubilising microorganisms is used in a proportion between 5% and 7%.

2. The method according to claim 1, wherein the natural carbon source is selected from leonardite, black coal, anthracite or lignite.

3. The method according to claim 2, wherein the natural carbon source is leonardite with the following characteristics:

|  | Average |
| --- | --- |
| pH | 3.27 |
| Humidity | 28.68% |
| Organic matter | 29.56% |
| $K_2O$ | 0.2% |
| Humic extracts | 25-38% |
| Humic acids | 17-30% |
| Fulvic acids | 15-25% |
| Al | 0.17% |
| Fe | 0.3% |
| Na | 0.25% |
| Si | 0.34% |
| MgO | 0.41% |
| CaO | 1.47% |

4. The method according to claim 1, wherein, in step i), starting materials are introduced into the granulator in a proportion of 50-80% by weight of the phosphate rock, 20-40% by weight of the natural carbon source, 3%-7% of the metabolic inducer of phosphorus-solubilising microorganisms, the metabolic inducer of phosphorus-solubilising microorganisms being in liquid form and the water in a proportion by weight of at least 10%.

5. The method according to claim 1, wherein the phosphate rock has the following characteristics:

| Chemical analysis | On dry sample |
| --- | --- |
| pH | 8.43 |
| Humidity 65° C. | 3.36% |
| Humidity 105° C. | 3.57% |
| Total $P_2O_5$ (gravimetry) | 25-40% |
| $P_2O_5$ ammonium citrate solution | 2.09% |
| $P_2O_5$ 2% citric acid solution | 15.77% |
| $P_2O_5$ 2% formic acid solution | 30.52% |
| Total CaO | 53.13% |
| Total Fe | 0.08% |
| $SO_3$ | 0.22% |
| Cl | 0.04% |
| Neutralising value | 36.31% |

6. A granulated phosphate fertiliser obtained according to the method according to claim 1, containing 25%-40% of total $P_2O_5$ with humic acids.

7. An organic amendment for direct use on agricultural and forest soils comprising the fertiliser according to claim 6 and/or for being mixed with other materials in order to obtain a complex fertilising product or an organo-mineral fertiliser.

* * * * *